(12) United States Patent
Kuriyama

(10) Patent No.: US 8,159,562 B2
(45) Date of Patent: Apr. 17, 2012

(54) STORAGE DEVICE, STORAGE METHOD AND COMPUTER-READABLE STORAGE MEDIUM FOR STORING VIDEO DATA

(75) Inventor: Yuji Kuriyama, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 237 days.

(21) Appl. No.: 12/706,129

(22) Filed: Feb. 16, 2010

(65) Prior Publication Data

US 2010/0208102 A1    Aug. 19, 2010

(30) Foreign Application Priority Data

Feb. 17, 2009    (JP) .................................. 2009-033981

(51) Int. Cl.
 *H04N 5/76* (2006.01)
 *H04N 5/222* (2006.01)
(52) U.S. Cl. .............................. 348/231.99; 348/333.05
(58) Field of Classification Search .................. 348/565, 348/567
See application file for complete search history.

(56) References Cited

U.S. PATENT DOCUMENTS

| 7,158,570 B2 * | 1/2007 | Nagumo et al. ......... 375/240.16 |
| 7,430,015 B2 * | 9/2008 | Ohki .............................. 348/459 |
| 7,817,913 B2 * | 10/2010 | Wang ............................. 396/155 |

FOREIGN PATENT DOCUMENTS

| JP | 2006-093776 A | 4/2006 |
| JP | 2006-203334 A | 8/2006 |
| JP | 2006-324834 A | 11/2006 |
| JP | 2006-324850 A | 11/2006 |
| JP | 2008-035280 A | 2/2008 |
| KR | 10-0446177 B1 | 8/2004 |

OTHER PUBLICATIONS

Korean Office Action dated Mar. 21, 2011 (and English translation thereof) in counterpart Korean Application No. 10-2010-0014124.
Japanese Office Action dated Jan. 11, 2011 and English translation thereof, issued in counterpart Japanese Application No. 2009-033981.

* cited by examiner

*Primary Examiner* — David Ometz
*Assistant Examiner* — Ahmed A Berhan
(74) *Attorney, Agent, or Firm* — Holtz, Holtz, Goodman & Chick, PC

(57) ABSTRACT

A storage device generates low frame rate video data by frame thinning high frame rate video data input. The storage device performs image synthesis on the low frame rate video data and the high frame rate video data, for which video data input has been delayed, into two screens.

8 Claims, 13 Drawing Sheets

FIG. 10

| PHOTOGRAPHY FRAME | SYNTHESIZED FRAME (PARENT) | SYNTHESIZED FRAME (CHILD) | BUFFER |
|---|---|---|---|
| 0 | | | 0 |
| ⋮ | | | ⋮ |
| 256 | | | 0 ~ 256 |
| 257 | | | 0 ~ 257 |
| 258 | | | 0 ~ 258 |
| 259 | | | 0 ~ 259 |
| 260 | | | 0 ~ 260 |
| 261 | 0 | 0 | 0 ~ 261 |
| 262 | 1 | 10 | 1 ~ 262 |
| 263 | 2 | 20 | 2 ~ 263 |
| 264 | 3 | 30 | 3 ~ 264 |
| 265 | 4 | 40 | 4 ~ 265 |
| 266 | 5 | 50 | 5 ~ 266 |
| 267 | 6 | 60 | 6 ~ 267 |
| 268 | 7 | 70 | 7 ~ 268 |
| 269 | 8 | 80 | 8 ~ 269 |
| 270 | 9 | 90 | 9 ~ 270 |
| 271 | 10 | 100 | 10 ~ 271 |
| 272 | 11 | 110 | 11 ~ 272 |
| 273 | 12 | 120 | 12 ~ 273 |
| 274 | 13 | 130 | 13 ~ 274 |
| 275 | 14 | 140 | 14 ~ 275 |
| 276 | 15 | 150 | 15 ~ 276 |
| 277 | 16 | 160 | 16 ~ 277 |
| 278 | 17 | 170 | 17 ~ 278 |
| 279 | 18 | 180 | 18 ~ 279 |
| 280 | 19 | 190 | 19 ~ 280 |
| 281 | 20 | 200 | 20 ~ 281 |
| 282 | 21 | 210 | 21 ~ 282 |
| 283 | 22 | 220 | 22 ~ 283 |
| 284 | 23 | 230 | 23 ~ 284 |
| 285 | 24 | 240 | 24 ~ 285 |
| 286 | 25 | 250 | 25 ~ 286 |
| 287 | 26 | 260 | 26 ~ 287 |
| 288 | 27 | 270 | 27 ~ 288 |
| 289 | 28 | 280 | 28 ~ 289 |
| 290 | 29 | 290 | 29 ~ 290 |
| 291 | 30 | 30 | 30 ~ 291 |
| 292 | 31 | 40 | 31 ~ 292 |
| 293 | 32 | 50 | 32 ~ 293 |
| 294 | 33 | 60 | 33 ~ 294 |
| 295 | 34 | 70 | 34 ~ 295 |
| 296 | 35 | 80 | 35 ~ 296 | n = 0, m = 260
n = 0, m = 261
n = 0, m = 262
n = 12, m = 262

FIG. 11

| PHOTOGRAPHY FRAME | SYNTHESIZED FRAME (PARENT) | SYNTHESIZED FRAME (CHILD) | BUFFER | |
|---|---|---|---|---|
| 557 | 296 | 530 | 286 ~ 557 | |
| 558 | 297 | 540 | 287 ~ 558 | |
| 559 | 298 | 550 | 298 ~ 559 | |
| 560 | 299 | 560 | 299 ~ 560 | |
| PHOTOGRAPHY ENDED | 300 | 300 | 299 ~ 560 | |
| | 301 | 310 | 299 ~ 560 | |
| | 302 | 320 | 299 ~ 560 | |
| | 303 | 330 | 299 ~ 560 | |
| | 304 | 340 | 299 ~ 560 | |
| | 305 | 350 | 299 ~ 560 | |
| | 306 | 360 | 299 ~ 560 | |
| | 307 | 370 | 299 ~ 560 | |
| | 308 | 380 | 299 ~ 560 | |
| | 309 | 390 | 299 ~ 560 | |
| | 310 | 400 | 299 ~ 560 | |
| | 311 | 410 | 299 ~ 560 | |
| | 312 | 420 | 299 ~ 560 | |
| | 313 | 430 | 299 ~ 560 | |
| | 314 | 440 | 299 ~ 560 | |
| | 315 | 450 | 299 ~ 560 | |
| | 316 | 460 | 299 ~ 560 | |
| | 317 | 470 | 299 ~ 560 | |
| | 318 | 480 | 299 ~ 560 | |
| | 319 | 490 | 299 ~ 560 | |
| | 320 | 500 | 299 ~ 560 | |
| | 321 | 510 | 299 ~ 560 | |
| | 322 | 520 | 299 ~ 560 | |
| | 323 | 530 | 299 ~ 560 | |
| | 324 | 540 | 299 ~ 560 | |
| | 325 | 550 | 299 ~ 560 | |
| | 326 | 560 | 299 ~ 560 | |
| | 327 | 560 | 299 ~ 560 | |
| | 328 | 560 | 299 ~ 560 | FRAME 560 IS ASSIGNED SINCE NO FRAME CORRESPONDS |
| | 329 | 560 | 299 ~ 560 | |
| | 330 | 330 | 299 ~ 560 | |
| | 331 | 331 | 299 ~ 560 | |
| | 332 | 332 | 299 ~ 560 | |
| | 333 | 333 | 299 ~ 560 | |
| | 334 | 334 | 299 ~ 560 | |
| | 335 | 335 | 299 ~ 560 | |
| | 336 | 336 | 299 ~ 560 | |
| | ⋮ | ⋮ | ⋮ | |
| | 560 | 560 | | |
| | SYNTHESIS ENDED | | | |

STORAGE DEVICE, STORAGE METHOD AND COMPUTER-READABLE STORAGE MEDIUM FOR STORING VIDEO DATA

This application is based on and claims the benefit of priority from Japanese Patent Application No. 2009-033981, filed on 17 Feb. 2009, the content of which is incorporated herein by reference.

BACKGROUND OF THE INVENTION

1. Field of the Invention

The present invention relates, for example, to a storage device, a storage method, and a computer-readable storage medium having stored therein a program for controlling a storage device, for generating and storing video data to be used to display the video data of two different playback speeds in two screens.

2. Related Art

In recent years, digital cameras and the like which generate video data of a high frame rate by carrying out high-speed photography of a subject are provided. Video data generated at a high frame rate using such digital cameras, when processed at a regular frame rate, are played back as slow-motion videos having less movement blur. For example, video data photographed at a high frame rate of 300 fps (frames per second), when processed at a regular frame rate of 30 fps, is played back as slow-motion video data at ¹/₁₀ speed.

Furthermore, an image playback method called "Picture In Picture" has been proposed in which, when fast-forwarding the video data, the video data is read out by dividing into a first time series axis corresponding to the fast-forwarding speed and a second time series axis preceding the first time axis by only a constant amount of time, and these two time series of video data are played back separately on a parent screen which is a screen of regular size and a child screen which is displayed as a small screen inside the parent screen.

When played back at a regular frame rate, high frame rate video data captured at high speed using the above-mentioned digital camera has less movement blur, but is played back as video images in slow motion. As a result, in order to appreciate overall movement, or to play back from a specific scene, fast-forwarding becomes necessary, and operations such as cueing also become cumbersome. In this manner, high frame rate video data still has problems with regard to convenience.

SUMMARY OF THE INVENTION

The present invention has been made in view of the above-mentioned conventional problems, and has an objective of providing a storage device, a storage method, and a computer-readable storage medium for storing a program for controlling a storage device, for storing video data which improves the convenience of high frame rate video data.

In order to solve the above-mentioned problems, a storage device according to a first aspect of the present invention is characterized by comprising: a video input unit that inputs video data, an image thinning unit that generates low frame rate video data that has had a frame rate reduced by frame thinning of the video data, a data delay unit that delays data, a video synthesis unit that synthesizes the low frame rate video data generated by way of the image thinning unit and the video data delayed by way of the data delay unit into two screens to generate synthesized video data, and a storage unit that stores the synthesized video data which has been synthesized by way of the video synthesis unit, in a storage medium.

In order to solve the above-mentioned problems, a storage method according to a second aspect of the present invention is characterized by a video image input step of inputting video data, an image thinning step of generating low frame rate video data that has had a frame rate reduced by frame thinning of the video data, a data delay step of delaying the data, a video synthesis step of synthesizing the low frame rate video data generated in the image thinning step and the video data delayed in the data delay step into two screens to generate synthesized video data, and a storage step of storing the synthesized video data which has been synthesized in the video synthesis step, in the storage medium.

In order to solve the above-mentioned problems, a computer-readable storage medium according to a third aspect of the present invention is characterized by having stored therein a program for causing a computer that controls a storage device storing video data to perform: a video input function for inputting video data, an image thinning function for generating low frame rate video data that has had a frame rate reduced by frame thinning the video data, a data delay function for delaying data, a video synthesis function for synthesizing the low frame rate video data generated by way of the image thinning function and the video data delayed by way of the data delay function into two screens to generate synthesized video data, and a storage function for storing the synthesized video data which has been synthesized by way of the video synthesis function, in a storage medium.

BRIEF DESCRIPTION OF THE DRAWINGS

FIG. 10 is a diagram illustrating operation of a frame buffer of the digital camera shown in FIG. 1;

FIG. 11 is a diagram, following FIG. 10, illustrating operation of the frame buffer;

DETAILED DESCRIPTION OF THE INVENTION

Hereinafter, an embodiment of the present invention is described in detail with suitable reference to the diagrams.

(1) First Embodiment

Figure 1:
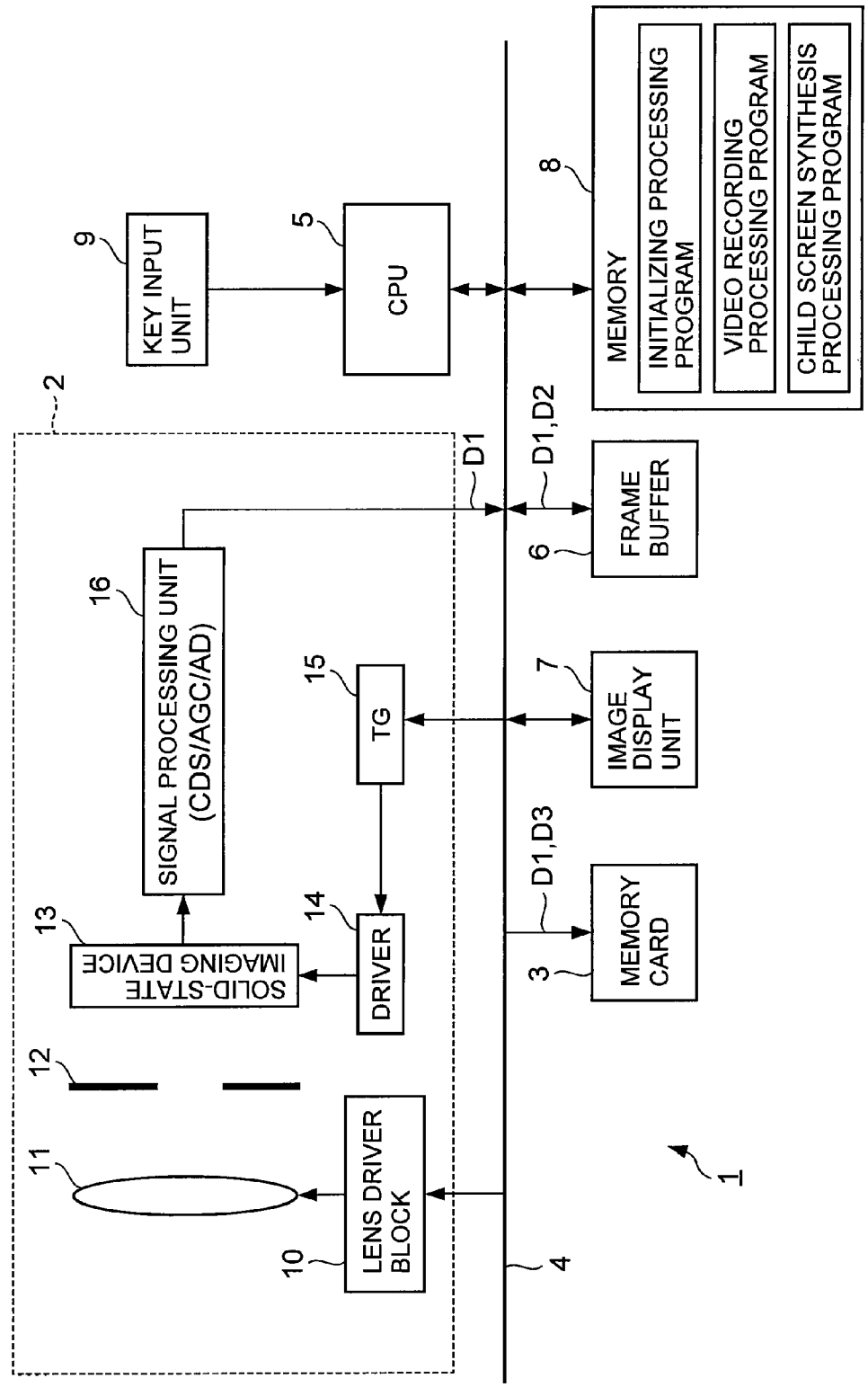
FIG. 1 is a block diagram showing a digital camera related to a first embodiment of the present invention.

(1-1) Configuration of the First Embodiment
(1-1-1) Overall Configuration FIG. 1 is a block diagram showing a digital camera related to a first embodiment of the present invention.

The digital camera 1 has an imaging system 2, a memory card 3, a bus 4, a CPU (Central Processing Unit) 5, a frame buffer 6, an image display unit 7, memory 8, a key input unit 9, and the like, and stores video data D1 acquired by way of the imaging system 2 on the memory card 3.

The imaging system 2 functions as a video input unit in the digital camera 1 of the present embodiment, and has a lens drive block 10, a lens 11, an aperture 12, a solid-state imaging device 13, a driver 14, a TG (Timing Generator) 15, a signal processing unit 16, and the like.

The lens driver block 10 changes a focus, a magnification, and an aperture 12 of the lens 11 by way of control of the CPU 5 via the bus 4. The lens 11 collects incident light on an imaging surface of the solid-state imaging device 13 via the aperture 12, and forms an optical image of the subject on the imaging surface of the solid-state imaging device 13.

The solid-state imaging device 13 may be a solid-state imaging device of such as, for example, a CCD (Charge Coupled Device), a CMOS (Complementary Metal-Oxide Semiconductor), or the like. The solid-state imaging device 13 operates according to various drive signals output from the driver 14, and outputs a captured optical image formed on an imaging surface as an imaging signal. A frame rate for imaging, a charge accumulation time, and the like for the solid-state imaging device 13 are controlled by the CPU 5. The driver 14 in the imaging system 2 generates a drive signal of the solid-state imaging device 13 according to various timing signals output from the timing generator 15. The CPU 5 controls the timing generator 15 via the bus 4. Accordingly, the timing signal output to the driver 14 is also controlled by the CPU 5.

The signal processing unit 16, after carrying out CDS (Correlated Double Sampling) on the imaging signal output from the solid-state imaging device 13, carries out AGC (Automatic Gain Control) and AD conversion (Analog to Digital conversion), and outputs the video data D1 according to the video image captured to the bus 4.

The frame buffer 6 is a working memory which temporarily stores the video data D1 output from the signal processing unit 16, i.e. the imaging system 2. At the time of image capture, the frame buffer 6 temporarily stores the video data D1 input from the imaging system 2 via the bus 4. The CPU 5 outputs and displays the video data D1, after input from and output to the frame buffer 6 and processing, on the image display unit 7. Furthermore, when an instruction to start recording is received from a user, the CPU 5 carries out processing by compression and the like on the video data D1. At playback time, the CPU 5 reads out video data D3 from a memory card and carries out decompressing thereof, and after temporarily storing the decompressed data D3 in the frame buffer 6, outputs and displays on the image display unit 7. Various techniques are applicable to the processing of compression and decompression; however, in the present embodiment, as an example, conformance to MPEG-2 thereby is assumed.

The image display unit 7 is a display unit configured of a liquid crystal display panel or the like, and at a time of image capture, acquires the video data D1 via the bus 4 from the frame buffer 6 according to control of the CPU 5 and carries out display thereof. The image display unit 7, similarly to at playback time as well, acquires the video data via the bus 4 from the frame buffer 6 according to control of the CPU 5 and carries out display thereof.

The CPU 5 is a controller controlling an operation of the digital camera 1 of the present embodiment.

For example, the CPU 5 executes a program stored in the memory 8, and in response to a user operation detected at the key input unit 9, controls operation of each unit of the digital camera 1 of the present embodiment. Furthermore, the CPU 5 carries out processing and the like of video data stored in the frame buffer 6. It should be added that, in the present embodiment, this program is described as being stored beforehand and provided in the memory 8, but the present invention is not limited thereto. For example, the program may also be provided by way of being stored on such a storage medium as a memory card, or by way of being downloaded through a network. The key input unit 9 functions as an instruction input unit accepting various instructions from a user in the digital camera 1 of the present embodiment. Hereinafter, instructions from the user are assumed as being input through the key input unit 9 unless described otherwise.

When a playback instruction to store a video image on the memory card 3 is received from the user, the CPU 5 sequentially acquires corresponding video data from the memory card 3, decompresses the video data, and carries out storage thereof in the frame buffer 6. Additionally, the CPU 5 sequentially transfers the video data from the frame buffer 6 to the image display unit 7 and carries out display thereof on the image display unit 7. In this manner, the CPU 5 plays back video data stored on the memory card 3 and carries out display thereof on the image display unit 7.

Moreover, upon receiving an instruction to capture an image from the user, the CPU 5 controls the imaging system 2 and sequentially stores the acquired video data D1 in the frame buffer 6. Furthermore, the CPU 5 carries out gamma correction processing, demosaic processing, white balance processing, and the like on the video data D1, carries out re-storage thereof in the frame buffer 6, transfers the re-stored video data to the image display unit 7, and carries out display thereof. As a result, the CPU 5 displays the captured image for a monitor on the image display unit 7.

When a storage instruction to record the captured video image is received from the user in a state in which the captured video image is displayed on the monitor, the CPU 5 sequentially reads out and carries out compression processing on the video data D1 stored in the frame buffer 6, and carries out storage thereof on the memory card 3. In this way, the CPU 5 stores the captured video image on the memory card 3.

At such times of photography, if an instruction to photograph in normal mode is received from the user, the CPU 5 controls the timing generator 15 or the like and acquires a video image captured in regular frame mode, for example, at a frame rate of 30 [fps], and stores the video data D1 captured in this manner in the frame buffer 6. The CPU 5 sequentially plays back the consecutive frames constituting the video data D1 stored in the frame buffer 6 and carries out displaying thereof on the image display unit 7. When an instruction to store a video image is received from the user, the CPU 5 sequentially compresses the consecutive frames constituting the video data D1 and carries out storage thereof on the memory card 3.

On the other hand, if an instruction to photograph in high-speed mode is received from the user, the CPU 5 commands the imaging system 2 to carry out photography at a predetermined high frame rate, or at a frame rate indicated by the user. The imaging system 2 carries out photography at the predetermined high frame rate, or at the frame rate indicated by the user. In the present embodiment, the high frame rate is assumed to be 300 fps. The CPU 5 stores the high frame rate video data D1 captured in this manner in the frame buffer 6. The CPU 5 may control the frame buffer 6 and read out the video data D1, carry out frame thinning on the video data D1 of the high frame rate stored in the frame buffer 6, and sequentially carry out displaying thereof on the image display unit 7 at a frame rate of 30 fps.

Furthermore, if an instruction to store is received from the user in a state in which high-speed photography is being carried out, the CPU 5 sequentially reads out the video data D1 from the frame buffer 6 as consecutive frames, and carries out compression and storage thereof on the memory card 3.

(1-1-2) Synthesis and Recording of the Video Data in High-speed Mode

When storing the video data D1 photographed in the high-speed mode, if the CPU 5 receives a command to carry out synthesis thereof with a video in normal speed mode, the video data temporarily stored in the frame buffer 6 is subject to frame thinning, and video data D2 in normal speed mode is generated. Furthermore, the CPU 5 carries out image synthesis of the video data D2 of normal speed mode with the video data D1 of high-speed mode into synthesized images, using the Picture in Picture technique, such that the video data D1 of high-speed mode is for the parent screen, and the video data D2 for the normal speed mode is for the child screen, and carries out storage thereof on the memory card 3. In other words, the video data D1 and D2 are stored on the memory card 3 simultaneously in a synthesized state. As a result, for example, when playing back at a regular frame rate, it is possible for the CPU 5 to display a slow-motion video using the video data D1 photographed in high-speed mode on the parent screen, and a video of high speed motion using the normal speed video data D2 on the child screen.

The CPU 5, for example, divides the plurality of frames constituting the video data D1 into predetermined units for processing corresponding to, for instance, a plurality of intervals spaced apart at a predetermined number of frames each, and sequentially synthesizes each of the divided pieces of video data sequentially from the beginning with video data of low frame rate. Here, the CPU 5 generates each of the pieces of the low frame rate video data, to be synthesized with each of the pieces of the video data D1 thus divided into the plurality of intervals sequentially from the beginning, by delaying and frame thinning each of pieces of the video data thus divided into the intervals.

Figure 2:
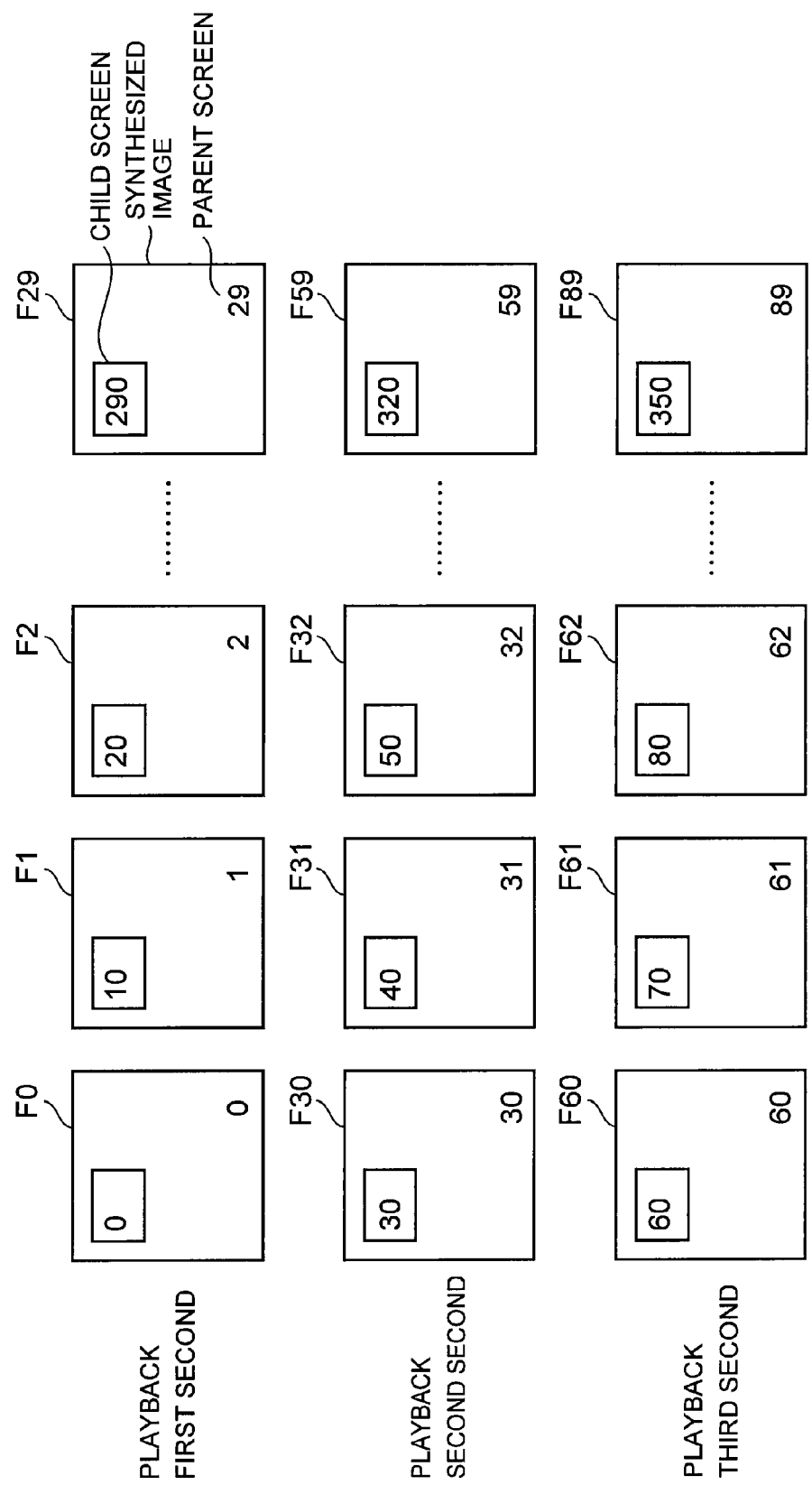
FIG. 2 is a diagram illustrating the operation of the digital camera shown in FIG. 1.

That is to say, as shown in FIG. 2, the CPU 5 according to the present embodiment, for example, synthesizes the high frame rate video data D1 photographed at 300 fps with the video data D2 which has been subjected to frame thinning to 30 fps, and generates the synthesized video data D3. Preferably, the video data D1 should be divided into even intervals. In FIG. 2, the intervals into which the video data D1 is divided are each 30 frames of the video data D1. In this case, the CPU 5 generates the beginning frame F0 of the synthesized video data D3 by synthesizing frame 0 of the video data D1 with frame 0 of the video data D1. Furthermore, the CPU5 generates the next frame F1 by synthesizing frame 1 of the video data D1 with frame 10 of the video data D1 as a video frame constituting the video data D2 of the low frame rate to be synthesized. The CPU generates the next following frame F2 by synthesizing frame 2 of the video data D1 with frame 20 of the video data D1 as a video frame constituting the video data D2 of the low frame rate to be synthesized. In this manner, in the present embodiment, the CPU 5 generates the synthesized video data D3 by respectively synthesizing frames 3, 4, 5, 6, 7, 8, and so forth of the video data D1 with frames 30, 40, 50, 60, 70, 80, and so forth of the video data 1, as video frames constituting the video data D2 of normal speed mode to be synthesized.

By repeating this image synthesis, the CPU 5, upon synthesizing frame 29 of the video data D1 with frame 290 of the video data D1, generates the succeeding frame F30, by synthesizing frame 30 of the video data D1 with frame 30 of the video data D1 which has been delayed by 30 frames from the beginning of the video data D1, as a video frame constituting the video data D2 of normal speed mode to be synthesized. Furthermore, the CPU 5 generates the succeeding frame F31, by synthesizing frame 31 of the video data D1 with frame 40 of the video data D1, as a video frame constituting the video data D2 of normal speed mode to be synthesized. Then, in this manner, the CPU 5 synthesizes frame 59 of the video data D1 with frame 320 of the video data D1, as a video frame constituting the video data D2 of normal speed mode to be synthesized. The CPU 5 then generates the succeeding frame F60, by synthesizing frame 60 of the video data D1 with frame 60 of the video data D1 which has been delayed by 60 frames from the beginning of the video data D1, as a video frame constituting the video data D2 of normal speed mode to be synthesized. In this manner, the CPU 5 divides the video data into a plurality of intervals F0 to F29, F30 to F59, F60 to F89, and so forth, and synthesizes each of the pieces of the video data divided into the plurality of intervals sequentially from the beginning with the video data D2 of normal speed mode. In other words, the CPU 5 generates each of the pieces of the video data D2 of normal speed mode, which are to be synthesized with each of the pieces of the video data D1 divided into the plurality of intervals F0 to F29, F30 to F59, F60 to F89, and so forth, sequentially from the beginning, by frame thinning each of the frames of the video data D1 from the beginning frame F0 by delaying by a predetermined interval, i.e. by 30 frames each.

Figure 4:
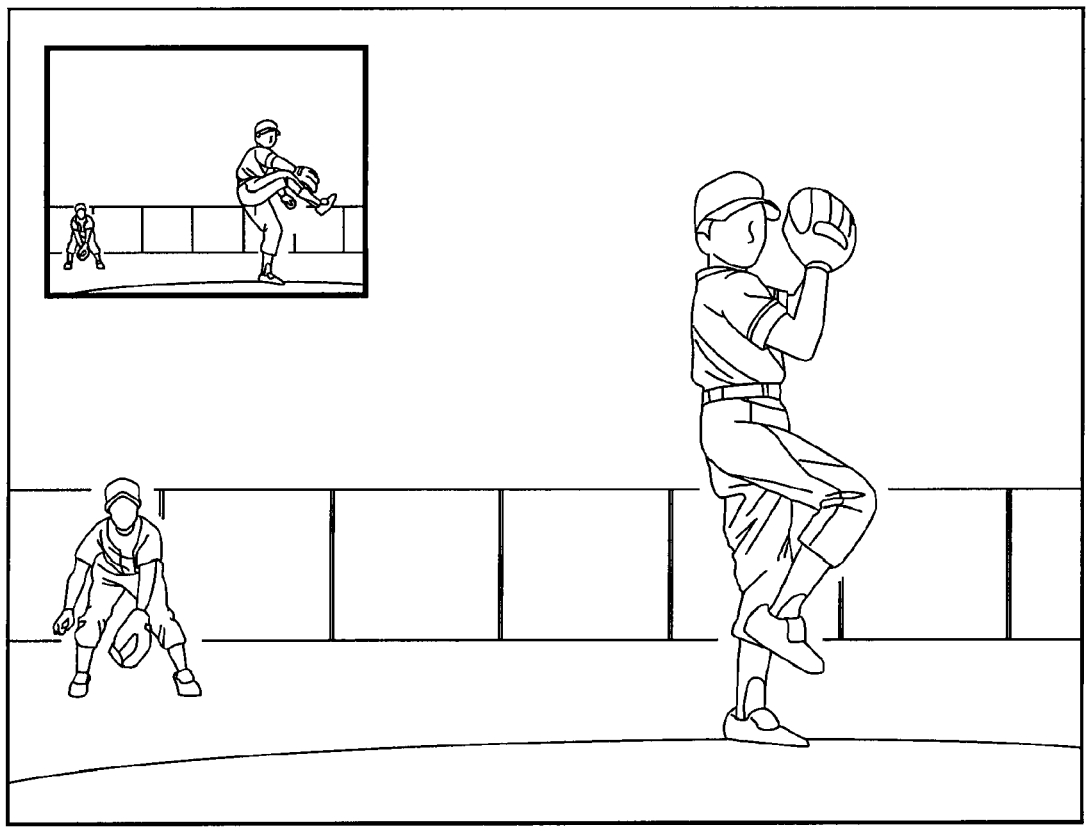
FIG. 4 is a diagram illustrating one example of an image being played back of synthesized video image stored by the digital camera shown in FIG. 1.

The CPU 5 repeats the sequence of processing, carrying out image synthesis of the sequentially input video data D1 with the video data D2 of normal speed mode and storing on the memory card 3. An example of an image being played back of the synthesized video image D3 synthesized in this manner and stored on the memory card 3 is shown in FIG. 4. On the parent and child screens are displayed, respectively, an image of the high frame rate video data D1 being played back, and an image of the low frame rate video data D2 being played back. It should be added that the frame rate of the video data to be synthesized with the video data D1 has been assumed to be of normal speed; however, the present invention is not limited thereto, and any frame rate lower than the frame rate of the video data D1 may be determined according to the implementation. At least one of the frame rates of the video data D1, the video image subjected to thinning, the intervals into which to divide the video data D1, and the intervals into which to delay the low frame rate video data to be synthesized with the high frame rate video data, can be determined according to an instruction from the user.

Figure 3:
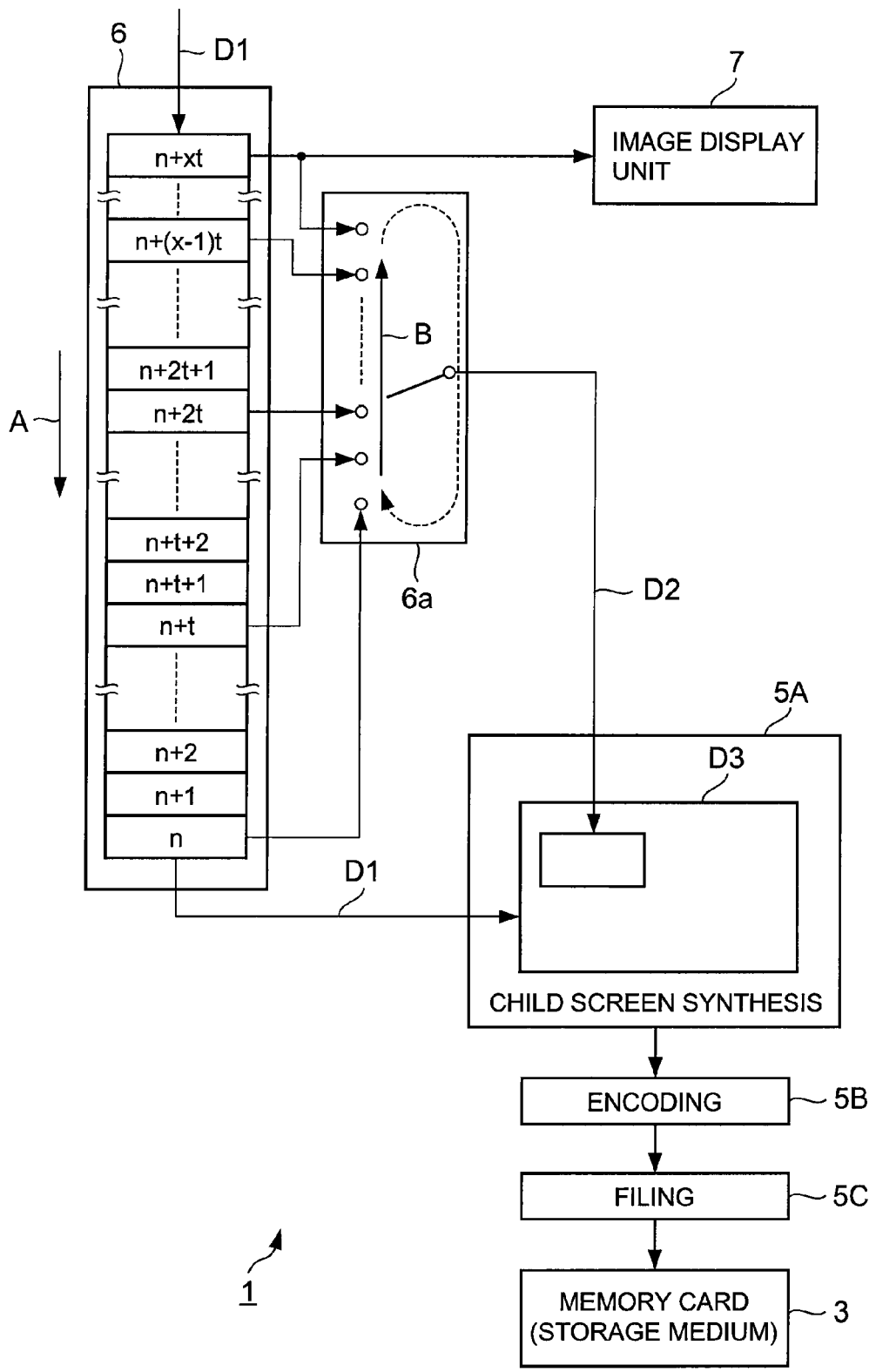
FIG. 3 is a functional configuration diagram of a main portion of the digital camera shown in FIG. 1.

FIG. 3 is a functional configuration diagram of a main portion of the digital camera 1 of the present embodiment. As shown in FIG. 3, the main portion of the digital camera 1 of the present embodiment is constituted by a frame buffer 6, a selecting circuit 6a for carrying out address control of the frame buffer 6, a child screen synthesis unit 5A, an encoding unit 5B, a filing unit 5C, and a memory card 3. Functionality of the selecting circuit 6a, the child screen synthesis unit 5A, the encoding unit 5B, and the filing unit 5C are achieved by the CPU 5.

The principle behind the generation of the synthesized video data D3 by the CPU 5 is described with reference to FIG. 3. As shown in FIG. 3, the CPU 5 configures the frame buffer 6 as a ring buffer by way of address control of the frame buffer 6. Furthermore, the frame buffer 6 is made to simultaneously function as a FIFO (First In First Out) queue of a number of stages corresponding to the number of frames into which the video data D1, described above, is divided.

In this manner, the CPU 5 delays the video data D1 sequentially input from the imaging system 2 by only a predetermined number of frames. In FIG. 3, consecutive frames constituting the video data D1 are represented as n, n+1, n+2, and so forth. In frame buffer 6, the video data D1 is sequentially input in the direction represented by the arrow designated by A, and the frames constituting the video data D1 are also sequentially updated.

As shown in FIG. 3, the frame buffer 6 contains the selecting circuit 6a. The CPU 5 controls the selecting circuit 6a and carries out address control on the frame buffer 6, and selectively acquires the video data D1 from a predetermined stage of the frame buffer 6. Here, the obtained video data is assigned as the low rate video data D2 to the video data of high speed mode for the parent screen by way of the Picture in Picture technique. More specifically, with a predetermined stage of the frame buffer 6 as a base, the CPU 5 sets the tap output for normal speed mode video for each of a predetermined number of stages, in the present embodiment, as represented by symbol B, for each of a predetermined number of frames. Furthermore, the CPU 5 sequentially selects the tap output as, for example, t=10, and generates the video data D2 of the normal speed mode. The CPU 5 carries out switching of the tap output for each frame of the video data D1, and generates video data D2 of the normal speed mode that has been subjected to frame thinning from the video data D1.

The CPU 5 controls the selecting circuit 6a, selectively carries out tap output, and in the first second, outputs the video data D1 for frames 0 to 29, and also outputs the video data D2 for the frame numbers 0 to 290 for which the frames have been thinned to $\frac{1}{10}$. Furthermore, the CPU 5, in the second second, outputs the video data D1 for frames 30 to 59, and also outputs the video data D2 for the frame numbers 30 to 320 for which the frames have been thinned to $\frac{1}{10}$. The CPU 5 sequentially repeats this type of operation. At the time of switching the intervals divided for the video data D1 when the frame number of the video data D1 shifts from 29 to 30, the frame of the normal speed mode video data D2 then shifts to the frame number 30, which is delayed by 30 frames from frame 0, which is the beginning frame of the video data D1. Furthermore, at the time of switching the intervals divided for the video data D1 when the frame number of the video data D1 shifts from 59 to 60, the frame of the normal speed mode video data D2 then shifts to the frame number 60, which is further delayed by 30 frames from frame 30. The CPU 5 sequentially repeats this type of operation.

Figure 5:
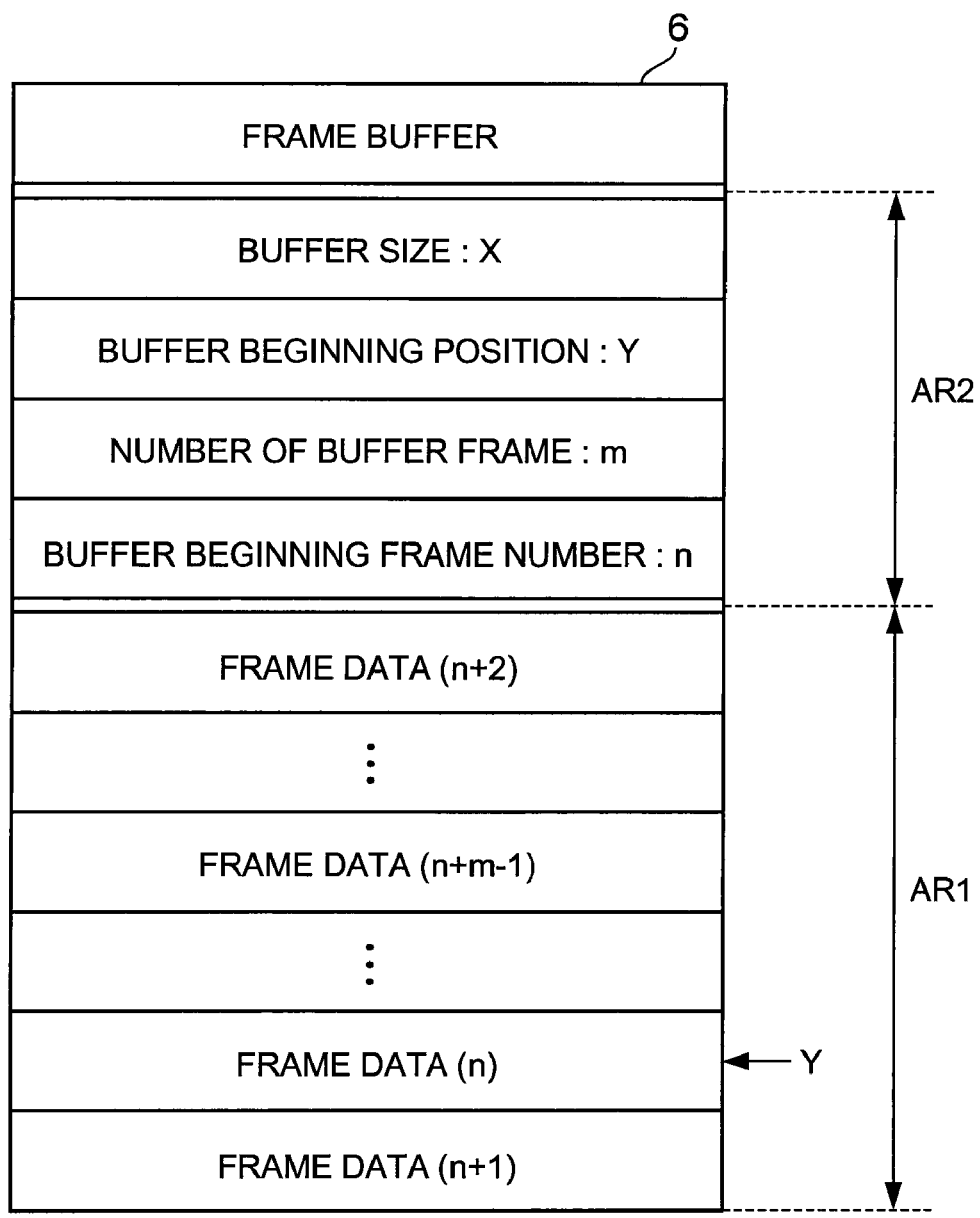
FIG. 5 is a diagram showing a configuration of a frame buffer of the digital camera shown in FIG. 1.

FIG. 5 is a diagram showing a configuration of the frame buffer 6. At the time of initialization to be described hereinafter, the CPU 5 reserves, in the frame buffer 6, only a predetermined amount of data of the data area AR1 in which to store the video data D1. Furthermore, the CPU 5 also reserves, in the frame buffer 6, a management information area AR2 in which to store the management data for the data area AR1. The size of the frame buffer 6 is assumed to be at least a size capable of temporarily storing the frames required for the time in which normal speed playback is to be repeated. In the present embodiment, the frame rates of the video data D1 and D2 are assumed to be 300 fps and 30 fps, respectively, and the coincident period C (seconds) is assumed to be one second. Therefore, assuming a case in which the parent screen frames and the child screen frames are maximally separated from each other, the CPU 5 reserves at least 262 frames (290 frames−29 frames+1 frame) in the data area AR1 of the frame buffer 6. In FIG. 5, the frame data represents frame data of the video data D1. Furthermore, the numbers in parentheses indicate respective frame numbers. In the management information area AR2, parameters such as the size (buffer size) X of the data area AR1, the positional information (buffer beginning position) Y of the pointer pointing to the position of the beginning frame stored in the data area AR1, the number of frames (number of buffer frames) m of the video data D1 stored in the data area AR1, and the beginning frame number (buffer beginning frame number) n of the video data D1 stored in the data area AR1, and the like, are stored.

While successively updating records in the management area AR2, the CPU 5 cyclically stores the video data D1 in the data area AR1. Furthermore, based on the records in the management information area AR2, the CPU 5 sequentially reads out the parent screen video data D1 and the child screen video data D2, and carries out the sequence of processing. In this manner, the frame buffer 6 functions as a ring buffer.

In the present embodiment, the number of stages of this FIFO queue (the predetermined number of frames, which are processing units) are configured at the time of initialization, and furthermore, the final stage of the FIFO queue is set for the parent screen output. During this prior configuration, the tap output stages of the child screen, the area cut out as the child screen, and the like are set. Hereinafter, the configuration processing is described.

Initialization Processing

Figure 6:
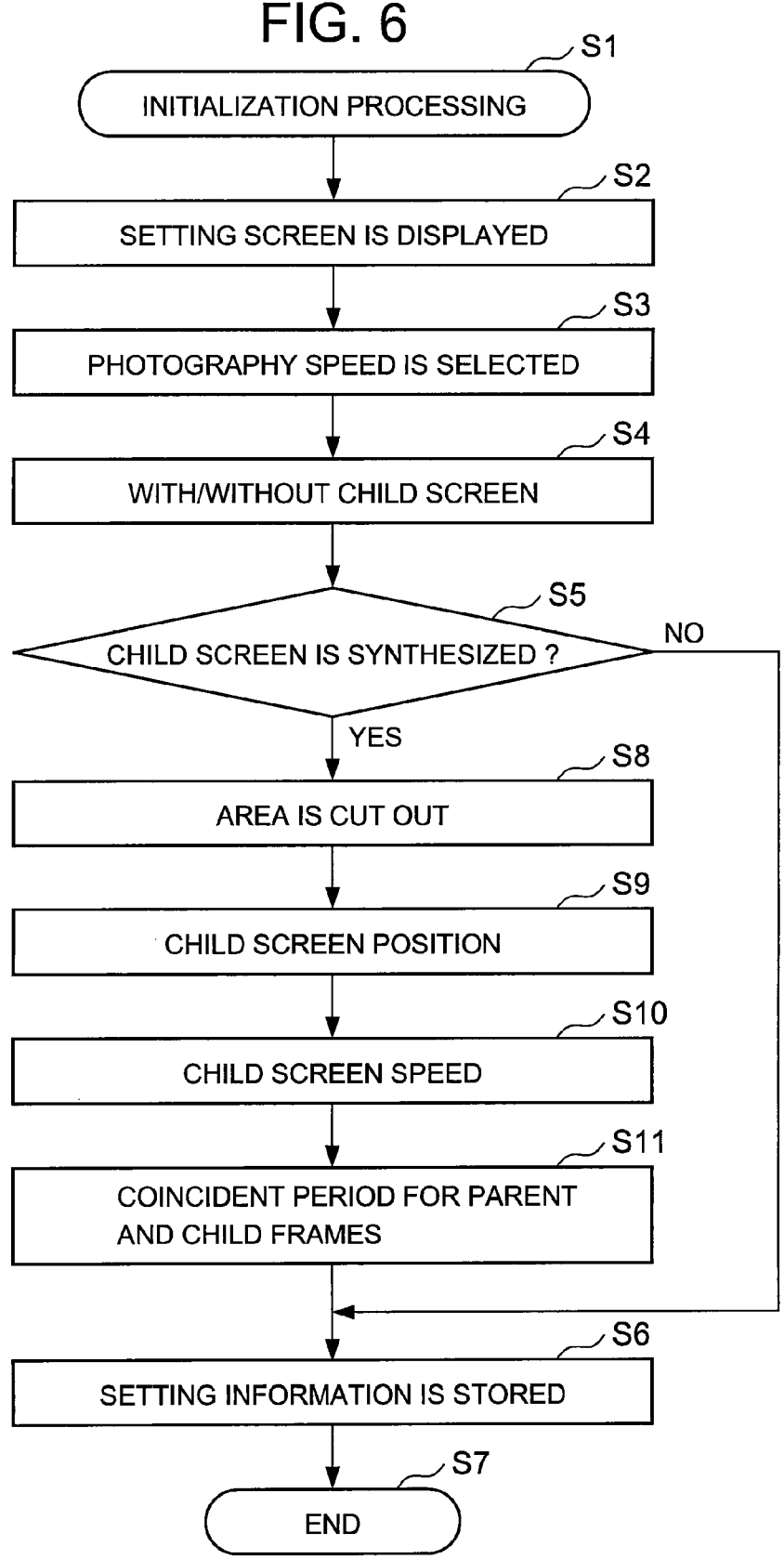
FIG. 6 is a flowchart illustrating "initialization processing" carried out by the digital camera shown in FIG. 1.

FIG. 6 is a flowchart showing a processing procedure of the CPU 5 in relation to the initialization processing. The CPU 5 begins the processing procedure when a predetermined operation piece installed on the key input unit 9 is operated (Step S1). First, the CPU 5 displays a predetermined menu screen on the image display unit 7 (Step S2). A user selects a photography speed by way of a predetermined operation from the menu screen (Step S3). Furthermore, according to a frame rate corresponding to the photography speed selected at the time of photography, the CPU 5 sets whether the video image captured by the imaging system 2 is to be synthesized with the video data having the child screen and stored, or stored as video data without a child screen (Step S4).

Next, the CPU 5 determines whether there has been an instruction to synthesize a child screen (Step S5). If it is determined that there has not been an instruction to synthesize a child screen, then the CPU 5 carries forward the processing to Step S6. On the other hand, if it is determined that there has been an instruction to synthesize a child screen, then the CPU 5 advances the processing to Step S8, and sets an area to be cut out for the child screen. It should be added that the configuration of the area may also be carried out such that, for example, a plurality of frames of different size are displayed on the image display unit 7, and a selection from the user is accepted.

Next, the CPU 5 sets the child screen position (Step S9). The configuration of the child screen may be carried out such that, for example, the child screen is displayed on the image display unit 7, and a selection from the user is accepted. Positions at which to display the child screen may, for example, be shown such that the user can choose from a variety of selections, such as upper right, upper left, lower right, lower left, or the like. Next, the CPU 5 sets the child screen speed (Step S10). Setting of the child screen speed may also be carried out such that a selectable plurality of speeds is displayed on the image display unit 7, and a selection from the user is accepted.

Next, the CPU 5 sets the period in which to have the frame numbers of the parent screen video data D1 and the child screen video data D2 coincide; more specifically, the period in which to have the frame numbers of the frames for the child screen and parent screen described in FIG. 2 coincide; for example, at one second, two seconds, and so forth. Next, the CPU 5 advances the processing to Step S6, and after storing the settings of the user as setting information, the processing procedure ends (Step S7).

Video Recording Processing

Figure 7:
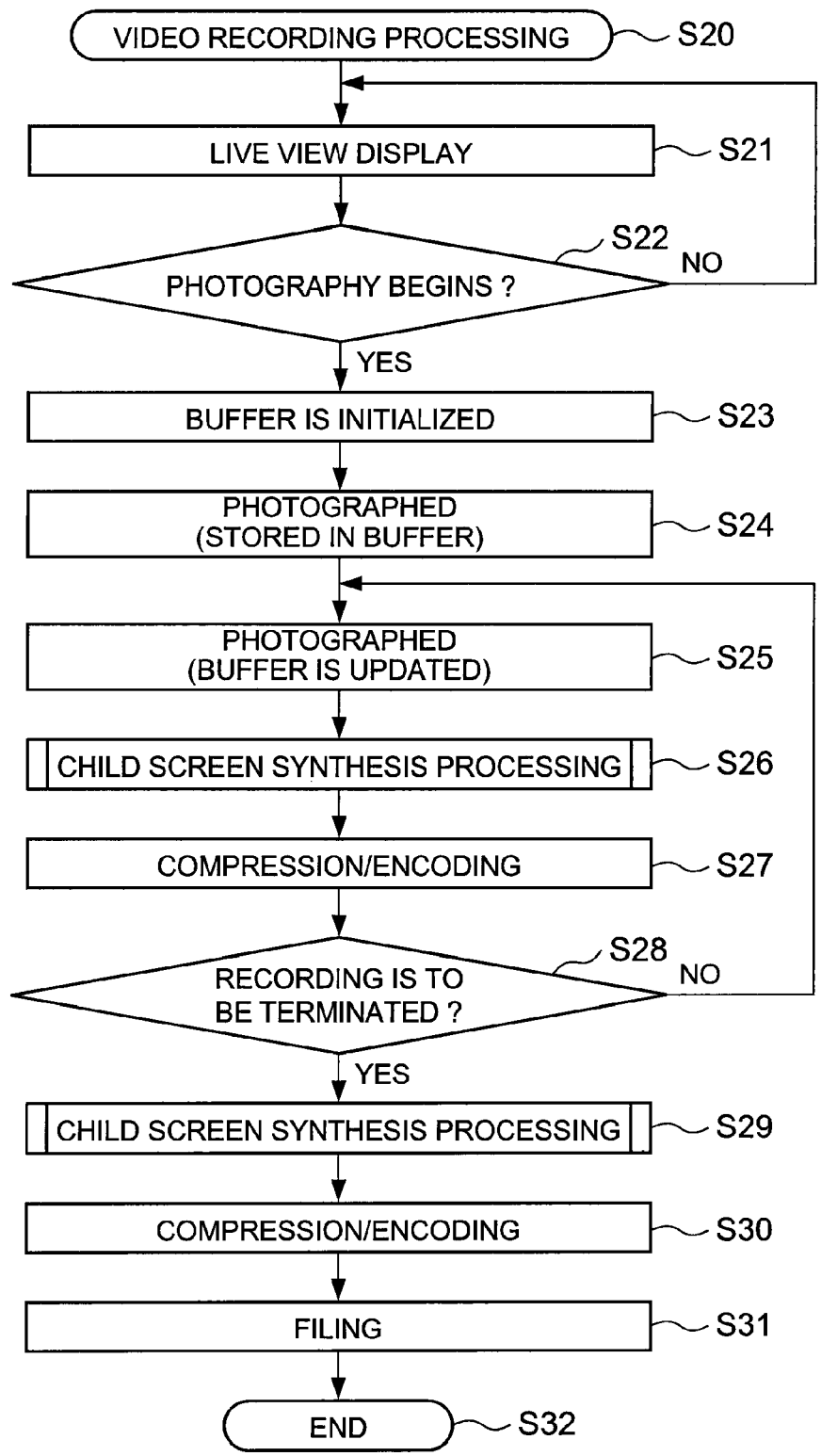
FIG. 7 is a flowchart illustrating "video recording processing" carried out by the digital camera shown in FIG. 1.

FIG. 7 is a flowchart showing a processing procedure of the CPU 5 in relation to video recording in which the video data D1 of high speed mode and the video D2 of normal speed mode are synthesized and stored. First, the CPU 5 displays a live view on the image display unit 7 (Step S21). Then, the CPU 5 determines whether to begin photography (Step S22). More specifically, the CPU 5 determines whether an instruction to begin photography has been received from the user. If it is determined that an instruction to begin photography has been received, the CPU 5 initializes the frame buffer 6 based on the setting information (Step S23). In the present embodiment, the frame buffer 6 is configured as a ring buffer, an area for being made to function as a FIFO queue is reserved, and the like, as described above.

Next, photography is carried out. More specifically, the CPU 5 stores only a number of frames of video data D1 sufficient for generation of the video data D2 in the frame buffer 6 (Step S24). Next, the buffer is updated (Step S25). More specifically, the CPU 5 outputs the oldest frames stored in the buffer while storing the images newly photographed in the buffer. The CPU 5 carries out child screen synthesis processing (Step S26), and generates the video data D3.

Next, the CPU 5 carries out compression processing on the generated video data D3 (Step S27). The CPU 5 determines whether an instruction to terminate recording has been received from the user (Step S28). If it is determined that an instruction to terminate recording has not been received, the CPU 5 returns the processing to Step S25.

On the other hand, if it is determined in Step S28 that an instruction to terminate recording has been received, the child screen synthesis processing is carried out. More specifically, the CPU 5 carries out child screen synthesis processing up to the frame that is displayed on the image display unit 7 at the point in time using the video data D1 that has been stored in the frame buffer 6. In this case, if there is no video data D1 to assign to the child screen among the video data D1 that has already been stored in the frame buffer 6, the CPU 5 repeatedly assigns to the child screen the last frame that has been assigned to the child screen up to that point.

Next, the CPU 5 carries out compression (Step S30) and filing (Step S31) on the generated video data D3. The CPU 5 stores the filed video data D3 on the memory card 3, and the recording processing ends (Step S32).

Figure 8:
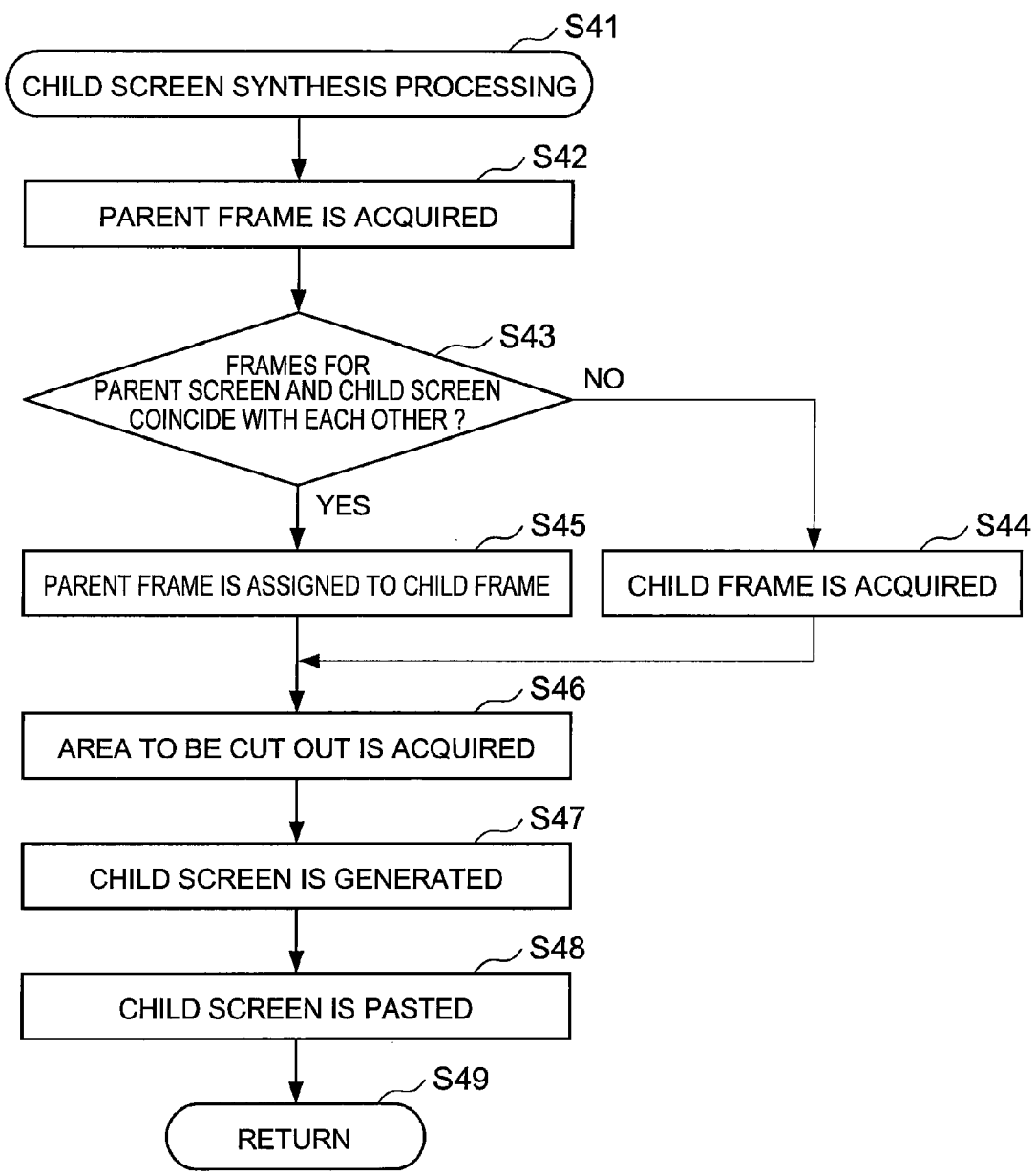
FIG. 8 is a flowchart illustrating "child screen synthesis processing" carried out in "video recording processing" of FIG. 7.

FIG. 8 is a flowchart illustrating details of the child screen synthesis processing of FIG. 7 to be executed by the CPU 5. Upon beginning the child screen synthesis processing (Step S41), the CPU 5 acquires the video data D1 for the parent screen from the frame buffer 6 (Step S42). Next, the CPU 5 determines whether the frame for the parent screen and the frame for the child screen coincide with each other (Step S42).

As described with reference to FIG. 2, it is assumed that the same frame of the video data D1 is assigned to both the parent screen and the child screen of the beginning frame. The case in which the frames for the child and parent screens coincide can be represented as MOD $\{N/(R \cdot C)\}=0$. Here, R represents the frame rate (fps) of the video data D2 calculated for the time of photography. Furthermore, N represents the frame number of the parent screen frame for image synthesis. C represents the coincident period (seconds) acquired in Step S11. MOD represents the modulus operator. For example, in the case of FIG. 2, R is 30 fps, C is 1 second, the frame numbers N of the parent screen frames are 0, 30, 60, and so forth, and MOD $\{N/(R \cdot C)\}=0$. That is to say, in the case in which MOD $\{N/(R \cdot C)\}=0$, the frame number of the child screen frame coincides with the frame number of the parent screen frame. On the other hand, in the case in which MOD $\{N/(R \cdot C)\}>0$, the frame number of the child screen frame can be represented by $N+\text{MOD}\{N/(R \cdot C)\} \times (S/R) \times K$. Here, S is the frame rate (fps) of the captured video image. Furthermore, K is the speed of the child screen set in Step S10. For example, in the case of FIG. 2, R is 30 fps, C is 1 second, S is 300 fps, K is 1 time (normal speed), and when the frame numbers of the parent screen frames are 0, 1, and 2, the frame numbers of the child screen frames are 0, 10, and 20, respectively.

In Step S43, if it is determined that the frames of the parent screen and the child screen do not coincide, then the CPU 5 acquires the child screen video data D2 from the frame buffer 6 (Step S44). More specifically, if the frames of the parent screen and the child screen do not coincide, that is to say, if it is determined that MOD $\{N/(R \cdot C)\}>0$, then the CPU 5 acquires frames of the frame numbers represented by $N+\text{MOD}\{N/(R \cdot C)\} \times (S/R) \times K$ from the video data D1. On the other hand, if it is determined in Step S43 that the frames of the parent screen and the child screen coincide, then the CPU 5 assigns the parent screen video data D1 acquired in Step S42 to the child screen video data (Step S45).

It should be added that, in the explanation with reference to FIG. 3, tap output identical to the parent screen represented by the symbol n+(x−1)t has been described as having been selectively output by way of the selecting circuit 6a. However, in the actual processing by the CPU 5, the parent screen video data is diverted to the tap output. The CPU 5 then specifies the area set in Step S8 from the setting information to be cut out (Step S46). Furthermore, the CPU 5 generates the video data D2 of the size cut out as video data for the child screen (Step S47). The CPU 5 then pastes the child screen video data generated in this manner onto the position of the parent screen video data set in Step S9 of FIG. 6 (Step S48). As a result, the CPU 5 generates the Picture in Picture synthesized video data D3, and the processing procedure ends (Step S49). Furthermore, when pasting the child screen, the CPU 5 also carries out resolution conversion processing for the video data D2.

Figure 9:
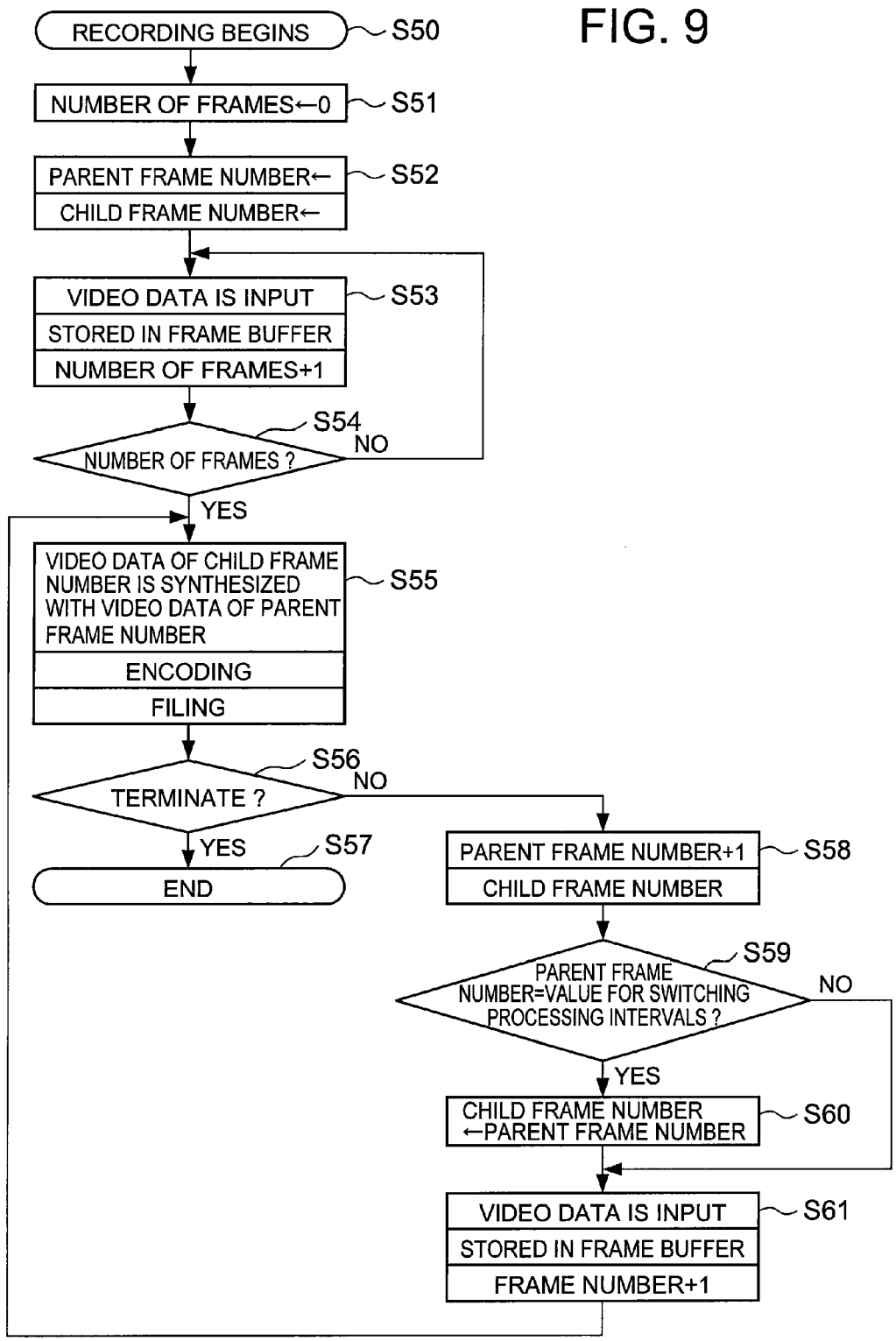
FIG. 9 is a flowchart illustrating address control of a frame buffer carried out by the digital camera shown in FIG. 1.

FIG. 9 is a flowchart illustrating in detail processing relating to address control carried out by the CPU 5 of the frame buffer 6 with regard to processing in Steps S24 to S32 of the processing procedure of the CPU 5 mentioned above in FIG. 7. FIGS. 10 and 11 are diagrams illustrating in detail frames of the video data stored in the frame buffer 6. With reference to FIGS. 9 to 11 and FIG. 3, the processing related to the control of the frame buffer 6 carried out by the CPU 5 is described in detail.

When the recording processing begins (Step S50), the CPU 5 initializes the number of buffer frames m of the management information area AR2 to the value 0 (Step S51). Next, the CPU 5 initializes the frame numbers of the frames for each of the parent and child screens (Step S52). The CPU stores one frame of the video data D1 in the frame buffer 6, increments the buffer frame number m by 1 accordingly, and updates the record of the management information area AR2 (Step S53). Next, the CPU 5 determines whether only a sufficient number of frames of the video data D1 for generation of the child screen video data D2 have been stored in the frame buffer 6 (Step S54). If it is determined that a sufficient number of frames have not been stored, the CPU 5 returns the processing to Step S53. Until only a sufficient number of frames of the video data D1 for generation of the video data D2 have been stored, the CPU 5 repeats Steps S53 and S54. In this manner, a predetermined number of frames of the video data D1 are stored in the frame buffer 6.

An example of a case in which the frame rates S and R (fps) of the video data D1 and D2 are 30 fps and 30 fps, respectively, and in which the coincident period C (seconds) is 1 second, and in which 262 frames of area have been reserved in the frame buffer 6 is shown in FIG. 10. In FIG. 10, "photography frame" represents the frame number of the frame of the video data D1 stored in the frame buffer 6 from the point at which photography has been instructed to start. "Synthesized frame (child)" and "synthesized frame (parent)" represent frame numbers of frames assigned to the child and parent screens, respectively. "Buffer" represents the frame number of the frame of the video data D1 stored in the frame buffer 6. In the example of FIG. 10, during the period from the beginning of photography until when the frame of frame number 260 of the video data D1 is stored, the CPU 5 repeats the processing of Steps S53 and S54. When the video data D1 of the frame number 261 is stored, it is determined in Step S54 that only a sufficient number of frames of the video data D1 for generation of the child screen video data D2 have been stored in the frame buffer 6, and the CPU 5 advances the processing to Step S55.

In Step S55, the CPU 5 reads out the video data of the parent frame number and the child frame number from the frame buffer 6 and carries out image synthesis, and carries out processing for encoding (compression) and filing. That is to say, the video data D1 and D2 are simultaneously encoded in a state of being synthesized, and are filed. Next, the CPU 5 determines whether an instruction to terminate recording has been received from the user (Step S56), and if it is determined that an instruction to terminate recording has been received, the processing procedure is ended (Step S57).

On the other hand, in Step S56, if it is determined that an instruction to terminate recording has not been received, then the CPU 5 increments the parent frame number by 1, and updates the child frame number according to the number of frames to be thinned (Step S58). Next, the CPU 5 determines whether the parent frame number has reached the switch value for switching between the intervals which have been divided (Step S59). If the switch value is determined to have been reached, the CPU 5 sets the child frame number to the parent frame number (Step S60), and moves to Step S61. In Step S59, even if it is determined that the switch value has not been reached, the CPU 5 moves to Step S61.

In this Step S61, the CPU 5 stores one frame of the video data D1 in the frame buffer 6, and updates the record for the management information area AR2. Then, the CPU 5 returns the processing to Step S55.

It should be added that, in the flowchart of FIG. 9, it is illustrated that the sequence of processing such as of image synthesis ends immediately upon an instruction to record being received from a user. However, in practice, as described with reference to Step S29 of FIG. 7, after receiving an instruction to terminate recording from the user, the child screen synthesis processing is carried out until the frame being displayed on the image display unit 7 at that point becomes the parent screen, using the video data D1 that has already been stored in the frame buffer 6. FIG. 11 is a chart showing an operation of the frame buffer 6 at the point of finishing of the recording. In FIG. 11, in the frame buffer 6, there is no image data to be assigned to, for example, the parent screen of frames 327, 328, and 329. As a result, the immediately preceding child screen image data (frame 560) is repeatedly assigned.

(1-2) Operation of the Present Embodiment

As described above, the digital camera 1 (FIG. 1) of the present embodiment carries out photoelectric conversion processing on the optical image formed by the lens 11 using the solid-state imaging device 13, generates an imaging signal which is the captured video image, and generates the video data by processing the image capture signal using the signal processing unit 16. The CPU 5 inputs the video data through the frame buffer 6, carries out compression processing and the like, and carries out storage on the memory card 3. Furthermore, upon receiving an instruction to playback from the user, the CPU 5 sequentially decompresses and plays back the video data stored on the memory card 3, and then carries out display thereof on the image display unit 7.

In the processing, if an instruction to photography in high speed mode is received from the user, photography is carried out at a predetermined high frame rate or at a frame rate indicated by the user, for example, a frame rate of 300 fps, and the high frame rate video data is output to the signal processing unit 16. The CPU 5 compresses the video data and carries out storage thereof on the memory card 3. When playing back the video data photographed in high speed mode, if an instruction to playback at a frame rate of 30 fps, which is a regular playback speed, has been received from the user, then, for example, the video data of the frame rate of 300 fps is played back at a frame rate of 30 fps and displayed on the image display unit 7. As a result, for the digital camera 1, it is possible to provide the user with a slow-motion image with dramatically less movement blur compared to a case in which photography is carried out at a regular photography speed (a frame rate of 30 fps), thereby improving convenience for the user.

However, for video data photographed in this kind of high speed mode, playing back at a regular frame rate results in playback as a slow-motion video image, and therefore, there is the issue that it is difficult to get a rough understanding of movement or to understand movement overall. For this reason, for example, when cueing, it eventually becomes necessary to switch operation to fast forwarding, and processing becomes cumbersome.

Therefore, as shown in FIGS. 2 to 4, upon receiving an instruction to synthesize and record with video at a speed lower than high speed, for example, normal speed mode, from a user when photographing in high speed mode, the digital camera 1 of the present embodiment carries out frame thinning on the video data D1 which is the captured video image, and generates the video data D2 of the frame rate lower than the video data D1, for example, normal speed mode. Furthermore, the digital camera 1 assigns the video data D2 for the normal speed mode to the child screen and synthesizes the image with the original video data D1, carries out compression processing on the obtained synthesized video data D3, and carries out storage thereof on the memory card 3.

As a result, the digital camera 1 plays back the video data photographed in high speed mode at a regular playback speed, and even while displaying a slow-motion video of less movement blur on the parent screen, for example, it is possible to display a video photographed at regular speed on the child screen. For example, in the example of FIG. 2, when playing back at a frame rate of 30 fps, the digital camera 1 can display a slow-motion video at ¹⁄₁₀ speed on the parent screen, and display a video of regular speed photographed at a frame rate of 30 fps on the child screen. As a result, even if the digital camera 1 is displaying a slow-motion video, it is possible for the user to appreciate the overall movement from the child screen display, and therefore, convenience for the user can be improved.

However, if only frame thinning is carried out in creating the video data D2 of normal speed mode, and image synthesis with the original video data D1 is carried out, then the number of frames for the child screen to be used for image synthesis can be insufficient by the number of frames by which frame thinning has been performed. Furthermore, since the child screen speed is relatively fast compared to the parent screen, the discrepancy between the parent screen and the child screen may gradually increase, and it may become difficult to comprehend the relationship between the parent screen and the child screen.

Therefore, in the digital camera 1 of the present embodiment, the video data D1 has been divided into a plurality of intervals, and each piece of the video data D1 corresponding to each of the intervals thus divided is sequentially synthesized from the beginning with the video data D2 of normal speed mode. Each piece of the video data D2 of normal speed mode to be sequentially synthesized from the beginning with each piece of the video data D1 thus divided into the plurality of intervals is generated by subjecting to frame thinning from the beginning of each piece of the video data D1 thus divided into the plurality of intervals.

As a result, the child screen frames do not diverge from the parent screen frames by more than a constant number of frames, and therefore, the relationship between the parent screen and the child screen becomes easier to comprehend.

Furthermore, in the digital camera 1 of the present embodiment, by an operation of the user, it becomes possible to set the frame rate of the video data D1 (FIG. 6, Step S3), and to set the speed of the video data D2 of the low frame mode (FIG. 6, Step S10), which is the normal speed mode in the present embodiment. Furthermore, it is possible to set the coincident period for the parent and child screen frames (FIG. 6, Step S11). As a result, it is possible to set such details as the playback speed of the video data of high and low frame mode, the processing for frame thinning, and the intervals into which to divide the video data D1. In this manner, it is possible to set various parameters of the parent and child screens according to usability for the user.

Furthermore, in the digital camera 1 of the present embodiment, the frame buffer 6 is constituted by a ring buffer, and carries out processing for generating image data for the child screen and processing for generating image data for the parent screen. Therefore, for the digital camera 1, it is possible to generate image data for the child screen and image data for the parent screen by way of address control of the frame buffer 6, and therefore, the configuration can be simplified.

(1-3) Effect of the Embodiment

According to the digital camera of the present embodiment as described above, the video data is subjected to frame thinning in generating the child screen video data, and the child screen video data is synthesized with the original video data by way of Picture in Picture and stored. Therefore, it is possible to improve the convenience of the high frame rate video data.

Furthermore, the video data D1 is divided into a plurality of intervals, and each of pieces of the video data D1 which have been divided into the plurality of intervals is synthesized with the video data D2 of normal speed mode sequentially from the beginning. Each of pieces of the video data D2 of normal speed mode to be synthesized sequentially from the beginning with each of pieces of the video data D2 which have been divided into a plurality of intervals is generated by subjecting to frame thinning from the beginning of each of pieces of the video data D1 which have been divided into the plurality of intervals, and therefore, each time that an interval of the video data D1 to be played back is switched, the video data D2 of normal speed mode to be played back is sequentially updated as well. Accordingly, the contents of the parent screen displayed based on the video data D1 and the contents of the child screen based on the video data D2 are set up not to diverge, and therefore, the relationship between the parent screen and the child screen is easy to comprehend.

Furthermore, according to a user operation, the frame rate of the input video data, the speed of the child screen video data, and the size of the processing units are constituted to be configurable, and therefore, operability for the user is improved.

Furthermore, the frame buffer is constituted by way of a ring buffer, and carries out processing for generating image data for the child screen and processing for generating image data for parent screen image data, and thus can be achieved by a simple configuration.

(2) Second Embodiment

Figure 12:
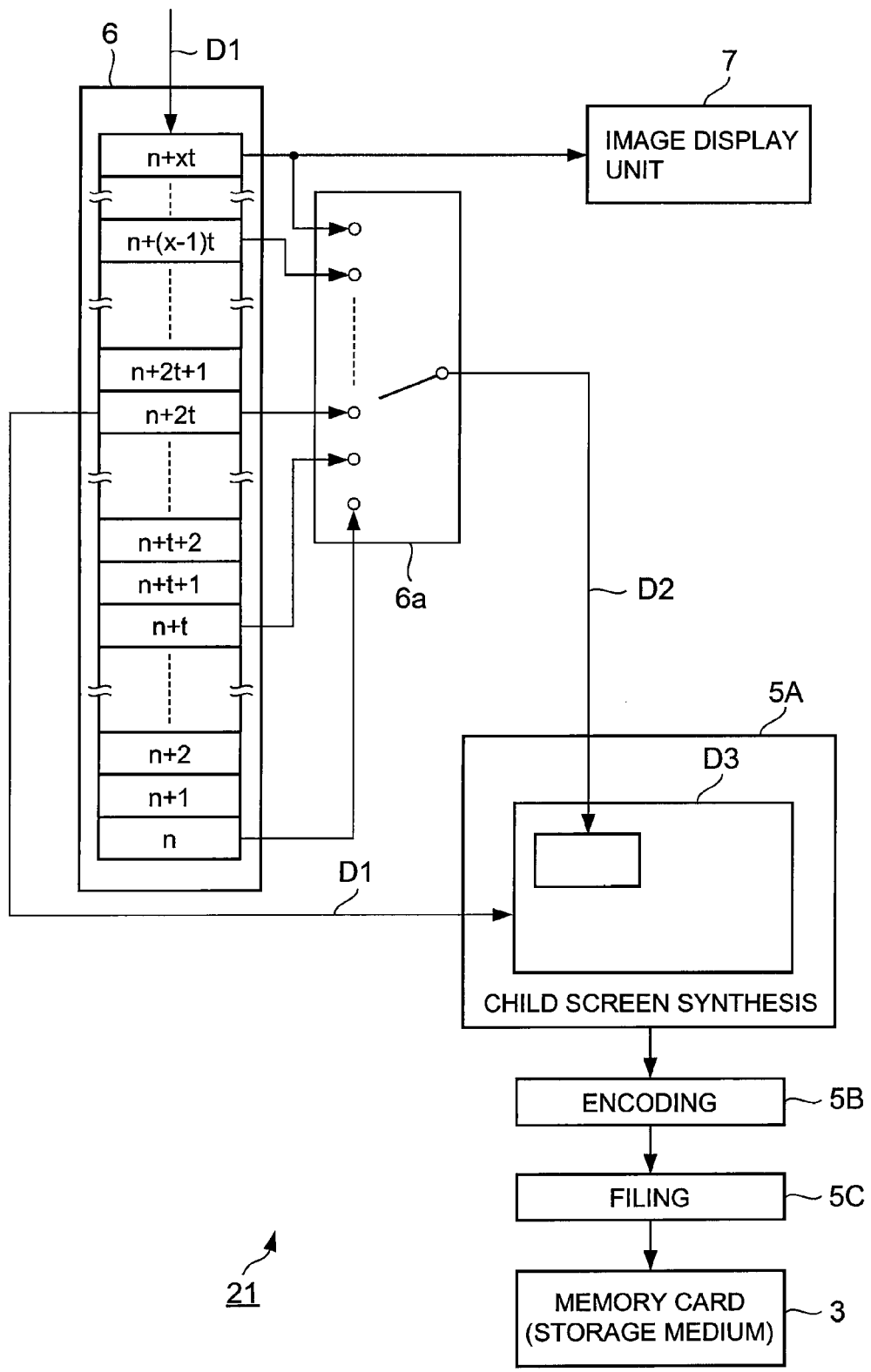
FIG. 12 is a functional configuration diagram of a main portion of a digital camera related to a second embodiment of the present invention.

FIG. 12 is a functional configuration diagram illustrating a main portion of the digital camera related to a second embodiment of the present invention. The digital camera 21 of the present embodiment, after storing the video data D1 in the frame buffer 6 in accordance with an operation of a user, modifies the delay time until output. In FIG. 12, the parent screen video data is output from the output stage of frame number n+2t. Except for the aspect in which the setting of the output stage is different, the digital camera 21 is the same as the digital camera 1 of the first embodiment. Regarding configurations similar to the digital camera 1 of the first embodiment, similar symbols have been added, and explanations thereof have been omitted. It should be added that the output stage of the parent screen video data may also be set as one tap output stage of the child screen video data, or may be set between the tap output stages of the child screen video data. According to this configuration, the digital camera 21 of the present embodiment can play back what is displayed in the parent screen from a given frame number.

In the digital camera 21 of the present embodiment, as a result of the modification of the output stage, it is possible to modify what is displayed in the parent screen with respect to the child screen in various ways. Therefore, it is possible to further improve convenience of the above-mentioned embodiment.

(3) Third Embodiment

Figure 13:
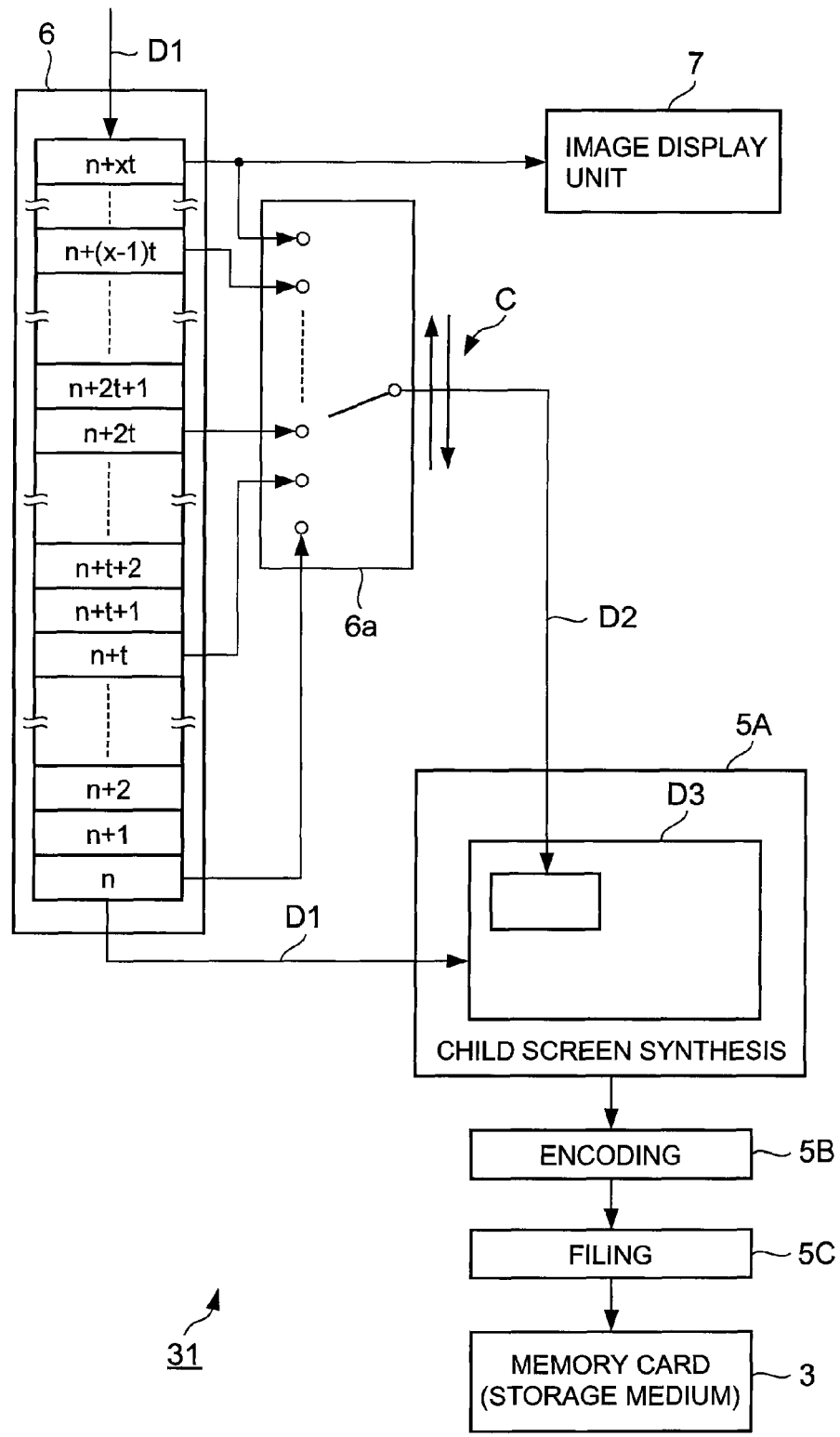
FIG. 13 is a functional configuration diagram of a main portion of a digital camera related to a third embodiment of the present invention.

FIG. 13 is a functional configuration diagram illustrating a main portion of the digital camera related to a third embodiment of the present invention. The digital camera 31 of the present embodiment switches the address control of the frame buffer 6 according to a user operation, and as shown by the arrow designated by C, can switch the order of switching the contacts in the selecting circuit 6a between directions in which the frame numbers increase and decrease. This switching may be carried out for one or each of a plurality of processing periods, for example, the switching may be set in one of either forward or backward directions and the playback direction fixed, or may be carried out for each coincident period of the frame numbers for the child screen and parent screen frames. Except for the aspect in which the configuration of the address control is different, the digital camera 31 is the same as the digital camera 1 of the first embodiment or the digital camera 21 of the second embodiment. Regarding similar configurations, similar symbols have been added, and explanations thereof have been omitted. If the switching order of the contacts is switched at a constant frequency, the tap output stage may also be made to be switched.

The digital camera 31 of the present embodiment switches the order of the frame number assigned to the child screen by switching address control, and can variously modify what is displayed in the child screen with respect to the parent screen. Therefore, it is possible to further improve the convenience of the above-mentioned embodiment.

(4) Other Embodiments

In the above-mentioned embodiments, explanations have been given concerning cases of configuring the frame rates of the input video data, speeds of the input screen video data, sizes of the processing units, and delay times relating to generation of the parent screen data, by way of an operation of the user. However, the present invention is not limited thereto, and all or any of these may be set to a fixed value.

In the above-mentioned embodiment, a case of cutting out a portion of the video data for the child screen and assigning the portion to the child screen has been described. However, the present invention is not limited thereto, and all of the video data for the child screen may be assigned to the child screen.

Furthermore, for example, in the child screen synthesis unit 5A, image synthesis may be carried out such that the video data D1 may be assigned to the child screen, and the video data D2 may be assigned to the parent screen. Furthermore, the frame rate of the video data to be synthesized with the video data D1 has been described as being of normal speed, but the present invention is not limited thereto, and the frame rate of the video data to synthesize with the video data D1 may be any rate as long as it is lower than the frame rate of the video data D1, or may be determined according to the implementation.

In addition, in the above-mentioned embodiment, a case in which video data for the parent and video data for child screens are generated using a frame buffer has been described. However, the present invention is not limited thereto and, for example, it is possible to carry out application thereof widely for such cases as frame thinning of the video data.

In the above-mentioned embodiment, a case has been described in which image synthesis is carried out by generating the child screen video data from video data of a high frame rate. However, the present invention is not limited thereto and, for example, it is possible to carry out application thereof widely even for the case in which, from video data of a frame rate of 30 fps, which is a regular frame rate, slow-motion video data for the child screen are generated, and these synthesized and stored.

In the above-mentioned embodiment, the present invention has been applied to a digital camera, and a case in which video data input from the imaging system 2 is processed has been described. However, the present invention is not limited thereby, and it may be possible to carry out application thereof widely even to such cases as, for example, a network, or to storing video data provided on various storage media on such a storage medium as a hard disk. Furthermore, it is possible to have a computer having the image capture device, including a CPU and memory, operate by way of a program functioning as each of the means described above. The program may be distributed through communication lines, or may be written to such storage media as a CD-ROM and distributed.

The present invention is not limited to the above-mentioned embodiments, and the above-mentioned embodiments may variously be combined, or, furthermore, the above embodiment may be variously made into embodiments in which a change in form has been applied within a scope not deviating from this object.

What is claimed is:

1. A storage device, comprising:
   a video input unit that inputs video data;
   an image thinning unit that generates low frame rate video data that has had a frame rate reduced by carrying out frame thinning on the video data;
   a video synthesis unit that synthesizes (i) the low frame rate video data generated by the image thinning unit and (ii) the video data in two screens to generate synthesized video data; and
   a storage unit that stores the synthesized video data which has been synthesized by the video synthesis unit, in a storage medium;
   wherein the video synthesis unit divides the video data into a plurality of intervals, and synthesizes the video data of each of the plurality of intervals and low frame rate video data associated therewith on a frame by frame basis; and
   wherein the image thinning unit generates low frame rate video data synchronous with the video data of each of the plurality of intervals, by using a respective leading frame of each one of the intervals as a leading frame of the low frame rate video data associated therewith.

2. A storage device as set forth in claim 1, wherein a number of frames of the video data contained in each of the plurality of intervals divided by the video synthesis unit is the same.

3. A storage device as set forth in claim 2, wherein:
   the video input unit includes a solid-state imaging device that converts captured video images and outputs an imaging signal, and a signal processing unit that processes the imaging signal and outputs the video data; and
   the storage unit includes an instruction input unit that inputs an instruction from a user, and a setting unit that sets at least one of a frame rate of the video data, a frame rate of the low frame rate video data, and the number of frames of the video data contained in each of the plurality of intervals.

4. A storage device as set forth in claim 1, wherein the video synthesis unit generates the low frame rate video data so as to be displayed in a child screen while the video data is displayed in a parent screen.

5. A storage device as set forth in claim 4, wherein the video synthesis unit generates the synthesized video data to be displayed in the child screen, by cutting out a portion of the low frame rate video data.

6. A storage device as set forth in claim 1, wherein the image thinning unit generates the low frame rate video data by carrying out frame thinning on the video data in a forward direction, and realigning in a backward direction.

7. A storage method for storing video data, the method comprising:
   a video image input step of inputting video data;
   an image thinning step of generating low frame rate video data that has had a frame rate reduced by carrying out frame thinning on the video data;
   a video synthesis step of synthesizing (i) the low frame rate video data generated in the image thinning step and (ii) the video data into two screens to generate synthesized video data; and a storage step of storing the synthesized video data which has been synthesized in the video synthesis step, in a storage medium;

wherein the video synthesis step divides the video data into a plurality of intervals, and synthesizes the video data of each of the plurality of intervals and low frame rate video data associated therewith on a frame by frame basis; and wherein the image thinning step generates low frame rate video data synchronous with the video data of each of the plurality of intervals, by using a respective leading frame of each one of the intervals as a leading frame of the low frame rate video data associated therewith.

8. A non-transitory computer-readable storage medium having stored therein a program for causing a computer that controls a storage device storing video data to perform functions comprising:

a video input function that inputs video data;

an image thinning function that generates low frame rate video data that has had a frame rate reduced by carrying out frame thinning on the video data;

a video synthesis function that synthesizes (i) the low frame rate video data generated by the image thinning function and (ii) the video data into two screens to generate synthesized video data; and a storage function that stores the synthesized video data which has been synthesized by the video synthesis function, in a storage medium;

wherein the video synthesis function divides the video data into a plurality of intervals, and synthesizes the video data of each of the plurality of intervals and low frame rate video data associated therewith on a frame by frame basis; and wherein the image thinning synthesis generates low frame rate video data synchronous with the video data of each of the plurality of intervals, by using a respective leading frame of each one of the intervals as a leading frame of the low frame rate video data associated therewith.

* * * * *